US010226830B2

(12) United States Patent
Thijssen et al.

(10) Patent No.: US 10,226,830 B2
(45) Date of Patent: Mar. 12, 2019

(54) METHOD FOR SKIVING MACHINING OF A WORKPIECE FOR PRODUCTION OF A CHAMFER

(71) Applicant: Felsomat GmbH & Co. KG, Königsbach-Stein (DE)

(72) Inventors: Johan Thijssen, Bilzen (BE); Jürgen Peschina, Knittlingen (DE)

(73) Assignee: FELSOMAT GMBH & CO. KG, Königsbach-Stein (DE)

( * ) Notice: Subject to any disclaimer, the term of this patent is extended or adjusted under 35 U.S.C. 154(b) by 0 days.

(21) Appl. No.: 15/453,378

(22) Filed: Mar. 8, 2017

(65) Prior Publication Data

US 2017/0173713 A1 Jun. 22, 2017

Related U.S. Application Data

(63) Continuation of application No. PCT/EP2015/069951, filed on Sep. 1, 2015.

(30) Foreign Application Priority Data

Sep. 10, 2014 (DE) .......................... 10 2014 218 082

(51) Int. Cl.
*B23F 1/06* (2006.01)
*B23F 5/16* (2006.01)
(Continued)

(52) U.S. Cl.
CPC .............. *B23F 5/163* (2013.01); *B23F 19/10* (2013.01); *B23F 1/06* (2013.01); *B23F 21/04* (2013.01);
(Continued)

(58) Field of Classification Search
CPC .......... B23F 1/065; B23F 1/026; B23F 5/205; B23F 5/163; Y10T 409/101272;
(Continued)

(56) References Cited

U.S. PATENT DOCUMENTS 2,295,148 A 9/1942 Witham
2,683,399 A 7/1954 Dodge
(Continued)

FOREIGN PATENT DOCUMENTS

CH 327821 A * 2/1958 .............. B23F 5/205
CN 1669709 A 9/2005
(Continued)

OTHER PUBLICATIONS

WO 2012159942 Machine Translation, Feb. 9, 2018, pp. 1-72.*
(Continued)

*Primary Examiner* — Nicole N Ramos
(74) *Attorney, Agent, or Firm* — Hackler Daghighian Martino & Novak

(57) ABSTRACT

A method for skiving machining a toothed workpiece includes the steps of: providing the toothed workpiece rotatable about a workpiece axis; providing a toothed tool rotatable about a tool axis; tilting the tool axis through an azimuth angle φ>0° with respect to an x direction; tilting the tool axis furthermore through a polar angle Θ<90° with respect to a z direction; rotating the toothed tool about the tool axis, the toothed tool in a contact zone sliding over the toothed workpiece rotating about the workpiece axis. The workpiece axis defines the x direction and the perpendicular of the contact zone to the workpiece axis defines a z direction. The x direction, a y direction and the z direction form a Cartesian coordinate system. This method can easily produce a chamber on the toothed workpiece with the toothed tool which is subject to fewer geometric restrictions.

11 Claims, 4 Drawing Sheets

(51) Int. Cl.
*B23F 19/10* (2006.01)
*B23F 21/04* (2006.01)

(52) U.S. Cl.
CPC ... *B23F 21/043* (2013.01); *Y10T 409/101272* (2015.01); *Y10T 409/105565* (2015.01)

(58) Field of Classification Search
CPC . Y10T 409/101159; Y10T 409/103816; Y10T 409/10477; Y10T 409/105724; Y10T 409/105883; Y10T 409/106201; Y10T 409/106519; Y10T 409/107632; Y10T 409/107791
See application file for complete search history.

(56) References Cited

U.S. PATENT DOCUMENTS

| | | | |
|---|---|---|---|
| 3,264,940 A | | 8/1966 | Wildhaber |
| 3,399,599 A | * | 9/1968 | Looman ............... B23F 5/163 409/34 |
| 3,570,367 A | * | 3/1971 | Looman ............... B23F 5/163 409/34 |
| 3,618,459 A | * | 11/1971 | Moncrieff ............. B23F 5/20 409/6 |
| 4,060,881 A | * | 12/1977 | Ryan .................. B23F 21/226 407/22 |
| 4,726,720 A | | 2/1988 | Lieser |
| 4,949,513 A | | 8/1990 | Schapp et al. |
| 5,079,877 A | * | 1/1992 | Abysov ............... B23F 19/025 451/114 |
| 5,174,699 A | * | 12/1992 | Faulstich ............. B23F 5/163 409/26 |
| 5,885,199 A | * | 3/1999 | Shao .................. B23F 17/006 29/27 C |
| 6,394,718 B1 | * | 5/2002 | Doerfel ............... B23F 5/163 409/132 |
| 6,676,337 B2 | | 1/2004 | Daniek |
| 7,103,973 B2 | | 9/2006 | Wolff et al. |
| 7,422,397 B2 | | 9/2008 | Mueller et al. |
| 7,624,505 B2 | | 12/2009 | Jaeger |
| 8,006,359 B2 | | 8/2011 | Jaeger |
| 8,769,820 B2 | | 7/2014 | Philippin et al. |
| 8,821,216 B2 | | 9/2014 | Schaeferling et al. |
| 8,950,301 B2 | | 2/2015 | Marx et al. |
| 9,120,165 B2 | | 9/2015 | Marx et al. |
| 9,981,330 B2 | | 5/2018 | Sjoo |
| 2005/0000072 A1 | | 1/2005 | Wolff et al. |
| 2009/0238654 A1 | | 9/2009 | Jaeger et al. |
| 2011/0229282 A1 | | 9/2011 | Ohno et al. |
| 2012/0282055 A1 | * | 11/2012 | Marx .................. B23F 5/163 409/37 |
| 2013/0266391 A1 | * | 10/2013 | Schweiker ........... B23F 5/163 409/51 |
| 2014/0105698 A1 | | 4/2014 | Vogel |
| 2015/0063927 A1 | * | 3/2015 | Sjoo .................. B23F 21/106 407/28 |
| 2015/0147129 A1 | * | 5/2015 | Nagata ............... B23F 21/12 409/32 |
| 2016/0158861 A1 | | 6/2016 | Kleinbach et al. |

FOREIGN PATENT DOCUMENTS

| | | | |
|---|---|---|---|
| CN | 101516559 A | 8/2009 | |
| CN | 201871820 U | 6/2011 | |
| DE | 243 514 C | 2/1912 | |
| DE | 2 157 619 A | 10/1972 | |
| DE | 33 12 984 A1 | 10/1984 | |
| DE | 37 34 653 C1 | 9/1988 | |
| DE | 43 19 326 A1 | 12/1994 | |
| DE | 4328801 A1 * | 3/1995 | ........... B23F 17/006 |
| DE | 10 2006 019 325 B3 | 9/2007 | |
| DE | 10 2007 015 357 A1 | 10/2008 | |
| DE | 10 2009 003 601 A1 | 9/2010 | |
| DE | 10 2009 018 405 A1 | 10/2010 | |
| DE | 10 2009 019 433 A1 | 11/2010 | |
| DE | 10 2013 012 797 A1 | 2/2015 | |
| EP | 0 107 826 B1 | 4/1988 | |
| EP | 1 270 127 A1 | 1/2003 | |
| EP | 1 495 824 B1 | 9/2010 | |
| EP | 2 066 473 B1 | 10/2010 | |
| EP | 2 246 138 A1 | 11/2010 | |
| EP | 2 520 391 A1 | 11/2012 | |
| EP | 2 537 615 A1 | 12/2012 | |
| EP | 2639001 A1 * | 9/2013 | ........... B23F 5/163 |
| EP | 2 845 675 A2 | 11/2015 | |
| GB | 818 135 A | 8/1959 | |
| GB | 867022 A * | 5/1961 | ........... B23F 5/205 |
| GB | 867964 A * | 5/1961 | ........... B23F 5/205 |
| GB | 1349127 A | 3/1974 | |
| JP | S618221 A | 1/1986 | |
| JP | 01 051 224 A | 2/1989 | |
| JP | 04240056 A * | 8/1992 | |
| JP | 2006224228 A * | 8/2006 | ........... B23F 17/006 |
| JP | WO 2014034495 A1 * | 3/2014 | ........... B23F 21/04 |
| WO | 94 29058 A1 | 12/1994 | |
| WO | 2009017248 A2 | 2/2009 | |
| WO | 2010 102992 A1 | 9/2010 | |
| WO | 2012 152660 A1 | 11/2012 | |
| WO | 2012 1599942 A1 | 11/2012 | |
| WO | 2015 014448 A2 | 2/2015 | |
| WO | WO 2015185186 A1 * | 12/2015 | ........... B23F 21/005 |

OTHER PUBLICATIONS

"Abdachen und Verzahnen in einer Aufspannung," Praewema Antriebstechnik GmbH, Nov. 1, 2013.
Fraesen und Entgraten in einem Arbeitsgang. Chamfer-Cut (Cutting and Deburring in One Process. Chamfer Cut) brochure, Fette GmbH.
Waelzfraesmachine LC 180 Chamfer Cut brochure, Liebherr-Verzahntechnink GmbH.
Waelzschaelen Skiving brochure, Praewerna Antriebstechnik GmbH.
Bernard & Company, You-Tube Video, "Gear Pointing Animation—GMTA", published Sep. 4, 2012, https://www.youtube.com/watch?v=seePhM7jhh4.
Thomas Bausch et al., Innovative Zahnradfertigung (a German textbook), 3rd Edition 2006, expert Verlag, Kapitel 8.
Wikipedia entry "Fase" (in German), version of Mar. 27, 2013.
Prawema Antriebstechnik GmbH, "High Speed Chamfering" brochure, allegedly dated 2001.
Uddeholm, "Schnittdaten Fermo" brochure, Feb. 3, 2005.

* cited by examiner

METHOD FOR SKIVING MACHINING OF A WORKPIECE FOR PRODUCTION OF A CHAMFER

CROSS-REFERENCE TO RELATED APPLICATIONS

This continuation application claims priority to PCT/EP2015/069951 filed on Sep. 1, 2015 which has published as WO 2016/037903 A1 and also the German application number 10 2014 218 082.1 filed on Sep. 10, 2014, the entire contents of which are fully incorporated herein with these references.

DESCRIPTION

Field of the Invention

The invention relates to a method for skiving machining a toothed workpiece, wherein a toothed tool, rotating about a tool axis, slides over the workpiece, rotating about a workpiece axis, in a contact zone, wherein the workpiece axis defines an x direction and the perpendicular of the contact zone to the workpiece axis defines a z direction, and the x direction, a y direction and the z direction form a Cartesian coordinate system, wherein the tool axis is tilted through an azimuth angle $\varphi > 0°$ with respect to the x direction.

Background of the Invention

During gear hobbing, toothings are cut into a workpiece with the teeth of a gear hobber, wherein the workpiece and the gear hobber are each rotated in engagement with one another. Subsequently, the tooth end edges of the workpiece are generally chamfered, both in order to remove burrs from the workpiece and to realize edge breaks. Chamfering can take place in principle by cutting or forming.

During forming chamfering, a portion of a chamfering tool is pressed against the tooth end edges of the workpiece, such that the material of the workpiece is plastically deformed locally. In the process, a secondary burr arises on the end side of each particular tooth of the workpiece (this typically being removed with a cutting tool) and a material throw-up arises on the tooth flank of each particular tooth. This material throw-up can be removed by precision milling or smoothing. Forming chamfering is thus associated with several individual steps using special tools or machines, thereby making this procedure relatively complicated. An example of hobbing machining with subsequent forming chambering is known from EP 2 066 473 B1.

Chamfers can also be produced on the tooth end edges of a workpiece by cutting. EP 1 495 824 B1 discloses using a deburring tool similar to a side milling cutter to dip between the tooth flanks of two adjacent teeth of a workpiece. Teeth are arranged one after another in the circumferential direction on the deburring tool, the tooth end sides of said teeth being used as rake faces, wherein the rake faces are oriented substantially parallel to the radial direction and parallel to the tool axis. This procedure is also known under the name "chamfer cut", cf. for example the company brochure of Fette GmbH, Schwarzenbeck, D E "Fräsen and Entgraten in einem Arbeitsgang. CHAMFER-CUT" ["Milling and deburring in one operation. CHAMFER-CUT"], undated, downloaded on May 6, 2014, or furthermore the company brochure of Liebherr-Verzahntechnik GmbH, Kempten, D E, "Wälzfräsmaschine LC 180 Chamfer Cut" ["Gear hobbing machine LC 180 Chamfer Cut"], dated September 2013.

Although the chamfer cut method makes it possible to use a deburring tool on the same mandrel as the gear hobbing tool, only comparatively shallow chamfer angles (measured with respect to the helix angle of the toothing of the workpiece) can be produced. Furthermore, a clearance radially beneath the tooth root on the workpiece is necessary axially next to the toothing of the workpiece; otherwise, the deburring tool creates a generally undesired interfering contour.

In order to produce toothings, in addition to gear hobbing, skiving is also known, cf. for example the company brochure of Präwema Antriebstechnik GmbH, Eschwege, D E, "Wälzschälen" [Skiving], undated, downloaded May 6, 2014. In skiving, a toothed workpiece, the tooth end edges of which are oriented substantially perpendicularly to the tool axis, is rolled against a workpiece, wherein the tool axis is tilted through a particular angle, usually about 30°, with respect to the workpiece axis ("crossed axes angle"). In skiving machining, the tool is moved parallel to the workpiece axis relative to the workpiece ("axial infeed").

The invention is based on the object of presenting a method with which a chamfer can be produced easily on a toothed workpiece, which is subject to fewer geometric restrictions.

SUMMARY OF THE INVENTION

This object is achieved by a method of the type mentioned at the beginning, which is characterized in that the tool axis is furthermore tilted through a polar angle $\Theta < 90°$ with respect to the z direction, and in that a chamfer is produced on the toothed workpiece with the tool.

According to the present invention, a modified skiving method for producing the chamfer at the peripheries of the tooth end edges of a toothed workpiece is used.

To this end, the toothed tool, which has a conventional toothing with teeth (optionally with a certain helix angle) extending substantially along the tool axis (tool axis of rotation) and tooth end edges oriented substantially perpendicularly to the tool axis, said tooth end edges being used as rake faces, is used. The tool is rolled against the workpiece in order to produce the chamfer and in the process is moved along the workpiece axis (workpiece axis of rotation), i.e. in the x direction, relative to the workpiece. The cutting action of the tool thus originates from an end side of the tool. The infeed in the x direction co-determines the axial depth of the chamfer on the workpiece and is therefore generally very much smaller than the axial thickness of the toothing of the workpiece.

In contrast to conventional skiving, however, the tool axis is not only tilted in the xy plane with respect to the workpiece axis (x axis) in relation to the azimuth angle $\varphi$, but also tilted out of the xy plane. Thus, a polar angle $\Theta$ of less than 90° with respect to the z-axis is set. The angle by which the tool axis is tilted out of the xy plane is also denoted $\gamma$ here.

It should be noted that the azimuth angle $\varphi$ in the xy plane is in this case measured positively in the direction of rotation, in which the smallest angle in terms of magnitude with respect to the x-axis is obtained. The polar angle $\Theta$ is measured positively in the direction of rotation, in which the smallest angle in terms of magnitude with respect to the z-axis is obtained.

With this double tilt, it is possible to produce chamfers on the workpiece in a targeted manner with edges of the tooth end faces of the tool, or to move along the edges of the tooth end faces of the workpiece without creating interfering contours in the toothing. No clearance is required axially adjacent to the toothing of the workpiece beneath the tooth root.

Furthermore, the geometry of the chamfer can be varied multifariously in the present method. Although the material removal (or the chamfer shape) at the workpiece is determined primarily by the shape of the tool, it is also possible to co-determine the material removal (or the chamfer shape) via a difference in speed between the tool and workpiece. Furthermore, during the production of the chamfer it is possible, in addition to the infeed in the x direction, to provide an infeed in the z direction, with which the shape of the chamfer can likewise be configured. In particular, the chamfer angle (that is, the angle between the chamfer face and the longitudinal direction of the toothing of the workpiece) can also be selected to be practically as large as desired, in particular also in the case of large helix angles of the toothing of the workpiece.

During skiving machining, the contact zone between the workpiece and tool is practically in a fixed position and only minimally extended; where necessary, the center of the contact zone in a time-averaged position can be used for the definition of the z direction.

Preferred embodiments of the invention:

In an advantageous variant of the method according to the invention, the azimuth angle $\varphi$ is greater than or equal to 10°, in particular $20° \leq \varphi \leq 60°$. As a result of a sufficiently large azimuth angle, hub damage during the production of the chamfer on the workpiece can be avoided. The azimuth angle (crossed axes angle) also co-determines the material removal at the chamfer to a considerable extent. In practice, the azimuth angle is generally selected to be 20° or more. It should be noted that the azimuth angle $\varphi$ is in this case measured positively in the direction of rotation in which the smallest angle in terms of magnitude with respect to the x-axis is obtained; the largest possible azimuth angle is thus 90°.

Likewise advantageous is a variant in which the polar angle $\Theta$ is less than or equal to 70°, in particular $10° \leq \Theta \leq 50°$. In other words, the tool axis is tilted out of the xy plane by an angle $\gamma$ of 20° or more. As a result of a sufficiently large angle $\gamma$, no interfering contour is generated in the toothing of the workpiece during the production of the chamfer. It should be noted that the polar angle $\Theta$ is in this case measured positively in the direction of rotation in which the smallest angle in terms of magnitude with respect to the z-axis is obtained; the largest possible polar angle is thus 90°.

In a preferred method variant, while the chamfer is being produced, the tool is moved in a relative manner only in the x direction toward the workpiece. This procedure is particularly simple and highly suitable in particular for chamfers on the workpiece that are comparatively short in the radial direction. The infeed in the x direction determines the axial depth of the chamfer on the workpiece. In order to produce the chamfer, in principle only small infeed lengths in the x direction are required, usually 3 mm or less, often even 1.5 mm or less.

An alternative embodiment in which, while the chamfer is being produced, the tool is moved both in a relative manner in the x direction toward the workpiece and in a relative manner in the z direction away from the workpiece, is advantageous. As a result of this procedure, chamfers on the workpiece that are extended in the radial direction can be readily produced. In particular, chamfers can even be applied to the tooth root of the workpiece.

A method variant in which, while the chamfer is being produced, the tool and the workpiece are rotated synchronously with a smooth differential ratio, is preferred. In other words, the skiving takes place with a ratio of the rotational speeds of the tool and workpiece which corresponds exactly to the ratio of the numbers of teeth of the workpiece and tool. This procedure is extremely simple, since the axial infeed of the tool relative to the workpiece can take place independently of the rotation of the workpiece and tool; this procedure can be used readily in particular in the case of toothings of the workpiece without a helix angle (axially parallel toothings).

In an alternative, advantageous method variant, while the chamfer is being produced, the tool and the workpiece are rotated with a non-smooth differential ratio. In other words, the skiving takes place with a ratio of the rotational speeds of the tool and workpiece which differs from the ratio of the numbers of teeth of the workpiece and tool. By way of the difference in speed, the geometry of the finished chamfer can be influenced. In particular, in this variant, chamfers can be created readily on a toothing of the workpiece with a helix angle.

Furthermore advantageous is a method variant in which only one chamfer of the workpiece is produced at a time on an end side of the toothed workpiece. In other words, only the left-hand chamfer or only the right-hand chamfer is produced on each particular tooth, or the end side thereof, on the end side of the workpiece (or the toothing thereof), but not the left-hand and right-hand chamfer at the same time. As a result, the chamfer angles can be set independently of one another, in particular by a different choice of polar angle, azimuth angle, differential ratio, x infeed and/or z infeed during the production of the two chamfers. In the scope of the invention, typically the two chamfers of each end side of a workpiece, i.e. a total of four chamfers, are produced individually and in any desired order temporally one after another.

In an advantageous method variant, a chamfer of the workpiece is produced on respective axially opposite end sides of the toothed workpiece at the same time. As a result of the parallel production of two chamfers, the production of the entire workpiece can be accelerated. However, for this variant, two mutually independent, toothed tools are necessary in order to produce the two chamfers simultaneously on the end sides of the workpiece (or the toothing thereof) by way of the skiving method according to the invention.

Particularly preferred is a method variant in which a tool is used which has asymmetrical tooth flanks in cross section perpendicularly to the tool axis. As a result, interfering contours on the workpiece can be avoided in the production of the chamfer, in particular in that contact of the tooth flank, which is located on the opposite side from the tooth flank with the active cutting edge, with the workpiece is avoided.

In a development of this method variant, the tool used has, on its tooth flanks, an active cutting edge for contact with the workpiece, having a cutting-edge angle $\varepsilon 1$ measured with respect to a radial direction, and an opposite, non-active cutting edge without contact with the workpiece, having a cutting-edge angle $\varepsilon 2$ measured with respect to the radial direction, and $|\varepsilon 1| \geq |\varepsilon 2| + 10°$, preferably $|\varepsilon 1| \geq |\varepsilon 2| + 20°$. In this development, the non-active cutting edge (or tooth flank which is located on the opposite side from the tooth flank with the active cutting edge) is retracted compared with the active cutting edge, i.e. turned closer to the radial direction, in order to avoid undesired contact with the workpiece by the non-active cutting edge, for instance in the toothing of the workpiece or at the tooth root.

Also preferred is a method variant in which a tool is used which extends axially along the tool axis 8 mm or less, preferably 4 mm or less, away from the contact zone. As a result of an axially short design, the creation of interfering contours can be avoided, in particular axially adjacent to the toothing of the workpiece beneath the tooth root. Since the cutting action of the tool originates substantially from the tooth end edges, which are substantially perpendicular to the tool axis, the axial extent of the tool is not important for producing the chamfer; however, the axial thickness of the tool should be great enough for sufficient mechanical stability to be ensured when the chamfer is cut.

Likewise preferred is a method variant in which a tool is used which narrows, in particular conically, away from the contact zone in an axial section along the tool axis. As a result of this, too, the creation of interfering contours on the workpiece can be prevented, in particular axially adjacent to the toothing of the workpiece beneath the tooth root.

Apparatuses for carrying out the method according to the invention:

The scope of the present invention also includes an apparatus for skiving machining a toothed workpiece, suitable for carrying out an above-described method according to the invention, having a workpiece spindle for rotating a toothed workpiece about a workpiece axis that extends in an x direction, having a tool spindle for rotating the toothed tool about a tool axis, and having a tool-spindle mount on which the tool spindle is held and which is displaceable in each case linearly in the x direction, a y direction and a z direction by means of a motorized displacement device, wherein the x direction, the y direction and the z direction form a Cartesian coordinate system, wherein the tool axis is tilted through an azimuth angle $\varphi>0°$ with respect to the x direction, and wherein the tool axis is furthermore tilted through a polar angle $\Theta<90°$ with respect to the z direction. With the apparatus according to the invention, a chamfer can be machined on a toothed workpiece, in particular in accordance with a method according to the invention as explained above, wherein the chamfer angle can be chosen in a wide range and interfering contours on the workpiece can be avoided. It should be noted that the azimuth angle $\varphi$ is typically 10° or more, and usually 20° or more, and the polar angle $\Theta$ is usually 70° or less.

In a preferred embodiment of the apparatus according to the invention, the tool-spindle mount is rotatable about an axis of rotation (DA) by means of a motorized turning device, in particular wherein the axis of rotation (DA) extends in the z direction. With the motorized turning device, the tool spindle, or the toothed tool arranged there, can change position for machining the two sides of a workpiece (or the two end sides of the toothing thereof); the two workpiece sides can then be machined in quick succession. Typically, the tool is changed only between two turned positions, rotated through 180°, in order to machine the front and rear sides of the workpiece.

Furthermore advantageous is an embodiment in which the tool spindle and a further tool spindle for rotating a further toothed tool about a further tool axis are held on the tool-spindle mount. With the tool on the tool spindle and the further tool on the further tool spindle, the left-hand and right-hand chamfer of the teeth of the workpiece can be produced on the same workpiece side. The two chamfers can be produced very quickly one after the other as a result.

In a development of this embodiment, provision is made for the further tool axis to be tilted through a further azimuth angle $-\varphi$, mirror-inverted in relation to the azimuth angle $\varphi$ of the tool axis, with respect to the x direction, and for the further tool axis to be tilted through the same polar angle $\Theta$ with respect to the z direction as the tool axis. As a result of this orientation of the tool axis and the further tool axis, the left-hand and right-hand chamfer can be produced under the same conditions.

Also preferred is an embodiment which provides for the apparatus to have a turning holder on which the workpiece spindle and at least one further workpiece spindle are arranged, and for at least one station having a gear hobbing head for hobbing machining a workpiece on one of the workpiece spindles and furthermore a station having the tool-spindle mount for chamfering a workpiece on another of the workpiece spindles by way of the skiving machining operation to be set up on the apparatus. By way of the turning holder, a workpiece can change rapidly between the stations, and, in addition, parallel machining of workpieces at both stations can take place, thereby achieving a high machine performance.

In a preferred embodiment, the x direction and the z direction lie in a horizontal plane. In this case, the tool acts laterally on the workpiece such that chips can drop down easily and do not impede further workpiece machining.

Further advantages of the invention can be gathered from the description and the drawing. Likewise, the abovementioned features and those that are set out below can each be implemented individually or jointly according to the invention in any desired combinations. The embodiments that are shown and described should not be understood as being a definitive list but rather as examples for outlining the invention.

BRIEF DESCRIPTION OF THE DRAWINGS

The invention is illustrated in the drawing and explained in more detail by way of exemplary embodiments. In the drawings.

DETAILED DESCRIPTION OF THE PREFERRED EMBODIMENTS

Figure 1:
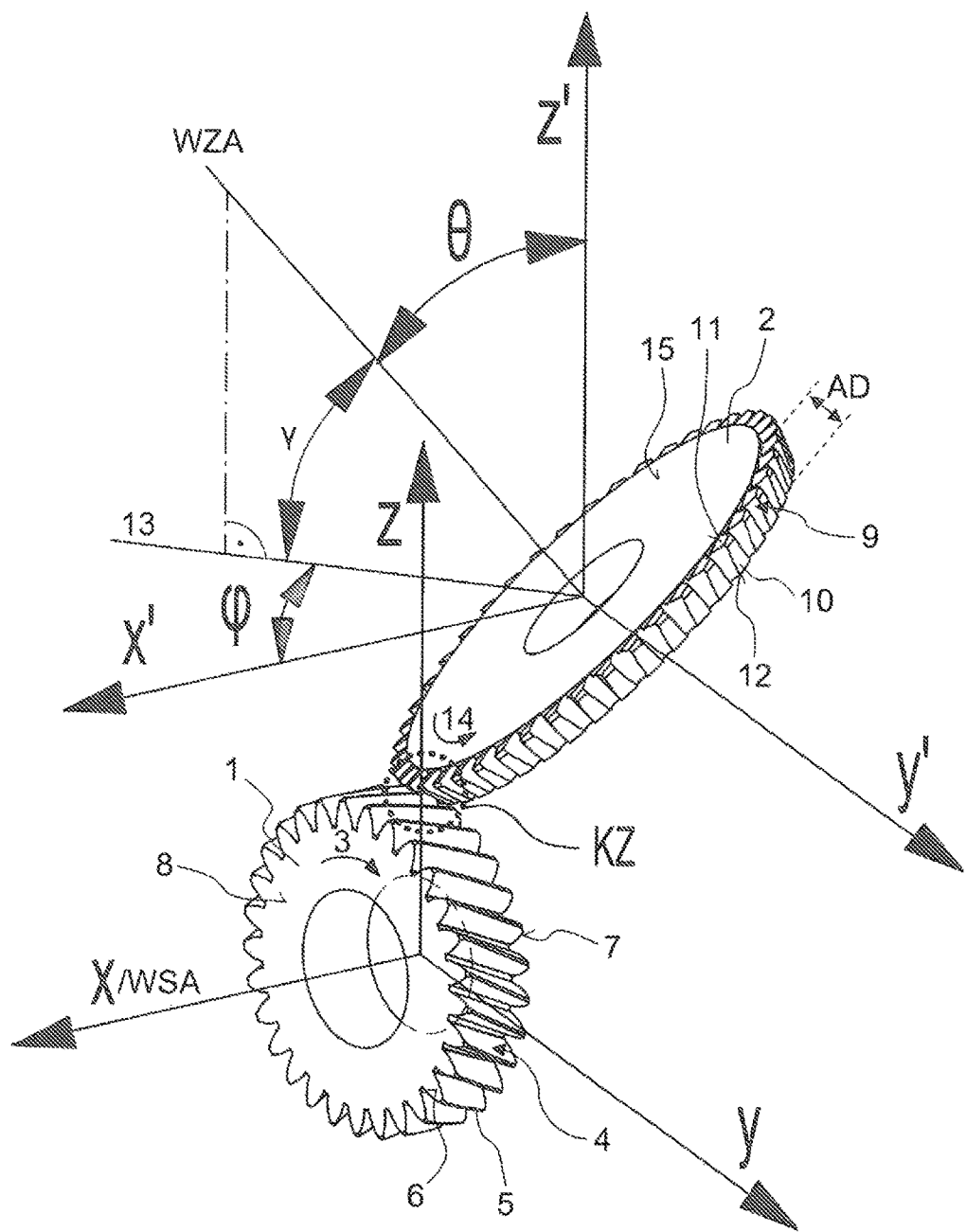
FIG. 1 shows a schematic illustration of the orientation of the workpiece and tool in the method according to the invention.

FIG. 1 illustrates the method according to the invention for producing a chamfer on a toothed workpiece 1, in this case a gearwheel, by way of a tooth tool 2.

The toothed workpiece 1 is held in a workpiece spindle (not illustrated) which rotates the workpiece 1 about a workpiece axis WSA (cf. also arrow direction 3). The workpiece axis WSA at the same time defines an x direction.

The workpiece 1 has a toothing 4 in which the individual teeth 5 extend substantially parallel to the workpiece axis WSA, in this case with a slight helix angle of about 15° with respect to the workpiece axis WSA. The tooth end edges 6 of the teeth 5 are substantially perpendicular to the workpiece axis WSA both on the front side 8 of the workpiece 1 and on the rear side 7 of the workpiece 1.

A chamfer is intended to be applied to the edges of the tooth end faces of the teeth 5 on the rear side 7 of the workpiece 1, which faces away from the observer. To this end, the workpiece 1 rolls against the tool 2. The tool 2 touches the workpiece 1 in the region of a contact zone KZ, which is located on the rear side 7 of the workpiece 1 in the variant shown, directly above the workpiece axis WSA. The perpendicular of the contact zone KZ to the workpiece axis WSA or the x-axis defines a z direction; the positive z direction is defined in this case from the x-axis to the contact zone KZ. It should be noted that the contact zone KZ has been illustrated in an exaggerated manner in FIG. 1; in actual fact, the spatial region in which the contact between the workpiece 1 and tool 2 takes place is very small.

The tool 2 has a toothing 9, wherein the teeth 10 are arranged substantially parallel to a tool axis WZA, about which the tool 2 rotates in a tool spindle (not illustrated), cf. also arrow direction 14. The tooth end faces 11, 12 of the teeth 10 are oriented substantially perpendicularly to the tool axis WZA.

According to the invention, the tool axis WZA is oriented in a particular manner with respect to the workpiece axis WSA or the x direction; this orientation can be described best in a Cartesian coordinate system having the axes x, y and z and with reference to conventional angle designations in spherical coordinates.

The tool axis WZA is tilted through an azimuth angle $\varphi$ which is greater than 0° with respect to the x direction in the xy plane. In the variant shown, the azimuth angle $\varphi$ is about 30°. In order to identify this azimuth angle $\varphi$ better, the projection 13 of the tool axis WZA onto the x'y' plane has additionally been indicated; the coordinates x', y', z' represent a coordinate system that is shifted parallel to the xyz system and in which the tilt angle of the tool axis WZA can easily be directly identified.

The tool axis WZA is also tilted through a polar angle $\Theta$ with respect to the z direction, wherein this polar angle $\Theta$ is less than 90°. In other words, the tool axis WZA is tilted through an angle $\gamma$ out of the x'y' plane toward the z' axis, wherein $\gamma = 90° - \Theta$. In the variant shown, the polar angle $\Theta$ is about 50° and the angle $\gamma$ accordingly about 40°.

During the production of the chamfer, the workpiece 1 and the tool 2 are rotated as per the arrow directions 3, 14, and at the same time the tool 2 is moved relative to the workpiece 1 at least in the x direction toward the workpiece 1; if desired, in order to adapt the chamfer shape, a relative z movement can also be overlaid. The ratio of the rotational speeds (angular speeds) in this case corresponds generally to the inverse ratio of the numbers of teeth, i.e. the number of rotating teeth per unit time is the same for the workpiece 1 and for the tool 2. In the variant shown, the workpiece 1 has 29 teeth 5 around the circumference, whereas the tool 2 has 44 teeth 10 around its circumference. Accordingly, the rotational speed of the workpiece 1 is selected to be 44/29 times the rotational speed of the tool 2 ("synchronous rotation with a smooth differential ratio"). Alternatively, it is also possible to provide a difference in speed, i.e. the number of rotating teeth per unit time is slightly different for the workpiece 1 and for the tool 2 ("rotation with a non-smooth differential ratio"); for example, the rotational speed of the workpiece 1 could be 44.1/29 times the rotational speed of the tool 2, in order to influence the shape of the chamfer.

In the embodiment shown, the axial thickness AD of the tool 2 is relatively small, in particular compared with the depth of the toothing 4 of the workpiece 1. Furthermore, the tool 2 narrows away from the top side 15, in this case over its entire axial thickness AD in a substantially conical manner, i.e. the external radius of the teeth 10 is greater close to the top side 15 (on which the rake faces of the tool 2 are formed, cf. in this regard also FIG. 3) than close to the underside. As a result of these two measures, contact between the workpiece 1 and the tool 2 is restricted reliably to the region of the edges of the upper tooth end faces 11 of the teeth 10; in particular, the tooth flanks of the teeth 10 do not create any interfering contour on the workpiece 1 away from the upper end face 11 and the lower tooth end faces 12.

Figure 2A:
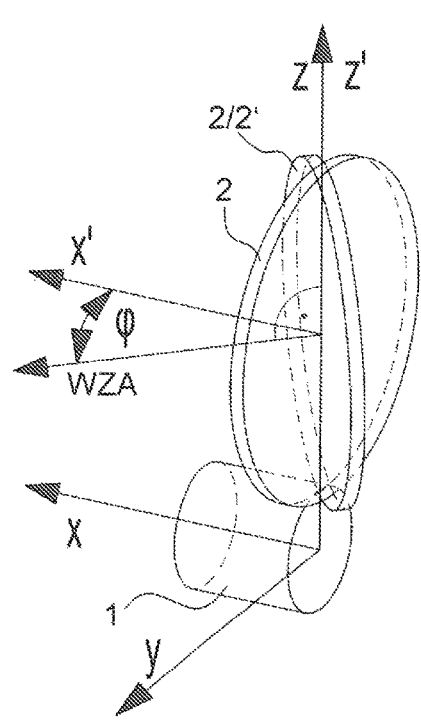
FIG. 2a shows a schematic illustration of the azimuth angle tilt of the tool in the method according to the invention.
Figure 2B:
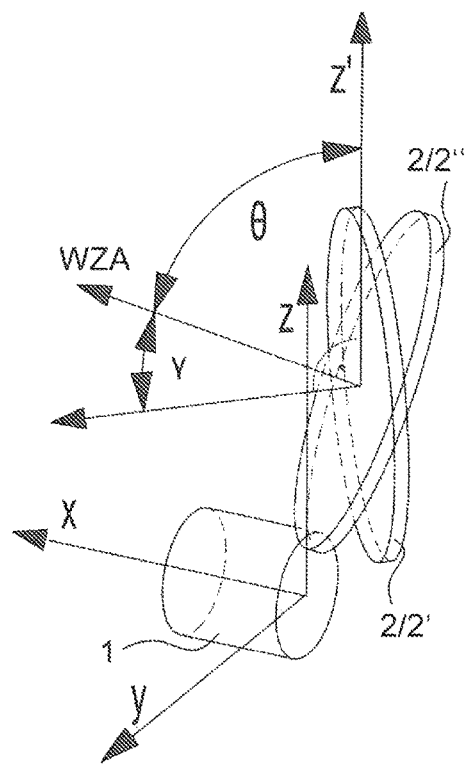
FIG. 2b shows a schematic illustration of the further polar angle tilt of the tool in the method according to the invention.

In FIGS. 2a and 2b, the tilt of the tool axis WZA with respect to the workpiece axis WSA is explained again in stages.

Proceeding from an initially parallel orientation of the workpiece axis WSA of the workpiece 1 (oriented in the x direction) and the tool axis WZA of the tool 2, first of all the tool 2 is tilted through the azimuth angle $\varphi$ toward the y-axis, cf. FIG. 2a, this ending in the orientation provided with the reference sign 2'. Such a tilt corresponds to conventional skiving.

With regard to this position, according to the invention, a further tilt through the angle $\gamma$ toward the z direction (or the z' axis) takes place, this ending with the orientation 2" of the tool 2, cf. FIG. 2b. As a result, the polar angle $\Theta = 90° - \gamma$ is set up.

It goes without saying, that in practice, the angles $\varphi$ and $\Theta$ can be set in any desired order or even simultaneously relative to one another; similarly, the angles $\varphi$ and $\Theta$ can also be fixed on a machine tool. What is relevant for the method according to the invention is the final orientation (denoted by reference sign 2" here) of the tool 2 relative to the workpiece 1 during chamfer production.

Figure 3:
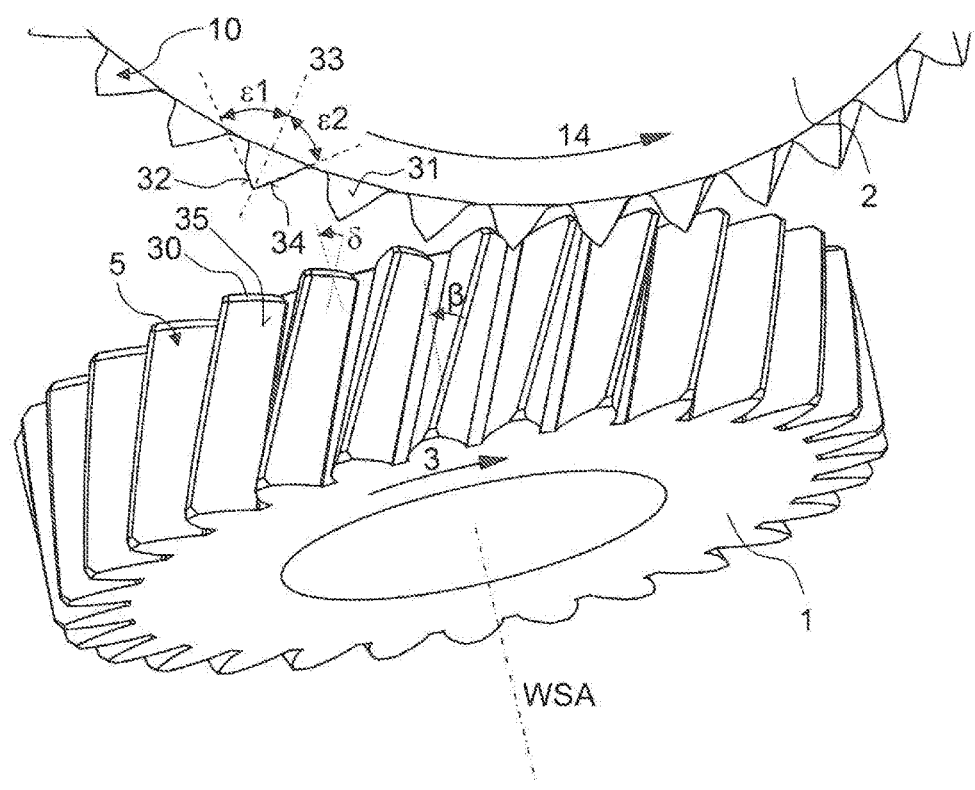
FIG. 3 shows a schematic illustration of the rolling of the workpiece and tool in the method according to the invention.

FIG. 3 explains in more detail how the tool 2 creates a chamfer 30 on the teeth 5 of the workpiece 1. In the perspective shown, the viewing direction is approximately along the tool axis WZA onto the tool 2 and the workpiece 1.

The teeth 10 of the tool 2 each have, on the tooth end faces 31 facing the workpiece 1, an active cutting edge 32 that is on the left-hand side in FIG. 3. This active cutting edge 32, or the associated tooth flank, has in this case a cutting edge angle $\epsilon 1$ of about 45° with respect to a radial direction 33 of the tool 2. A non-active cutting edge 34, or the associated tooth flank, which is located on the opposite side from the active cutting edge 32, has a cutting edge angle $\epsilon 2$ of about 35° with respect to the radial direction 33. The teeth 10 thus have asymmetrical tooth flanks.

In the variant in FIG. 3, while the workpiece 1 and tool 2 roll, cf. the arrow directions 3, 14, the teeth 10 of the tool 2 dip from the side into the intermediate spaces between the teeth 5 of the workpiece 1. In the process, the active cutting edge 32 bears initially against a lower part of the edge, facing the tool 2, of the right-hand tooth flank 35 of a tooth 5 and then scrapes upward along the edge of the tooth flank 35; the tooth end face 31 of the tooth 10 is thus used as a rake face. As a result, the chamfer 30 is produced. The chamfer 30 is thus created here by a cutting movement from (axially) outside to inside. Chips are conveyed out of the intermediate spaces between the teeth 5 during this sequence. The non-active cutting edge 34, by contrast, does not touch the workpiece 1.

By moving the tool 2 along the workpiece axis WSA toward the workpiece 1 at least with one movement component, the chamfer 30 is enlarged (i.e. deepened and widened).

In the variant shown, the chamfer angle δ, that is to say the angle between the face of the chamfer 30 and the adjacent face of the tooth flank 35 (which in this case extends with a helix angle β of about 25°) is approximately 30° in the case of the teeth 5.

It should be noted that, by reversing the directions of rotation, scraping of the active cutting edge 32 from top to bottom along the edge of the tooth flank 35 of the tooth 5 can be set up.

Figure 4:
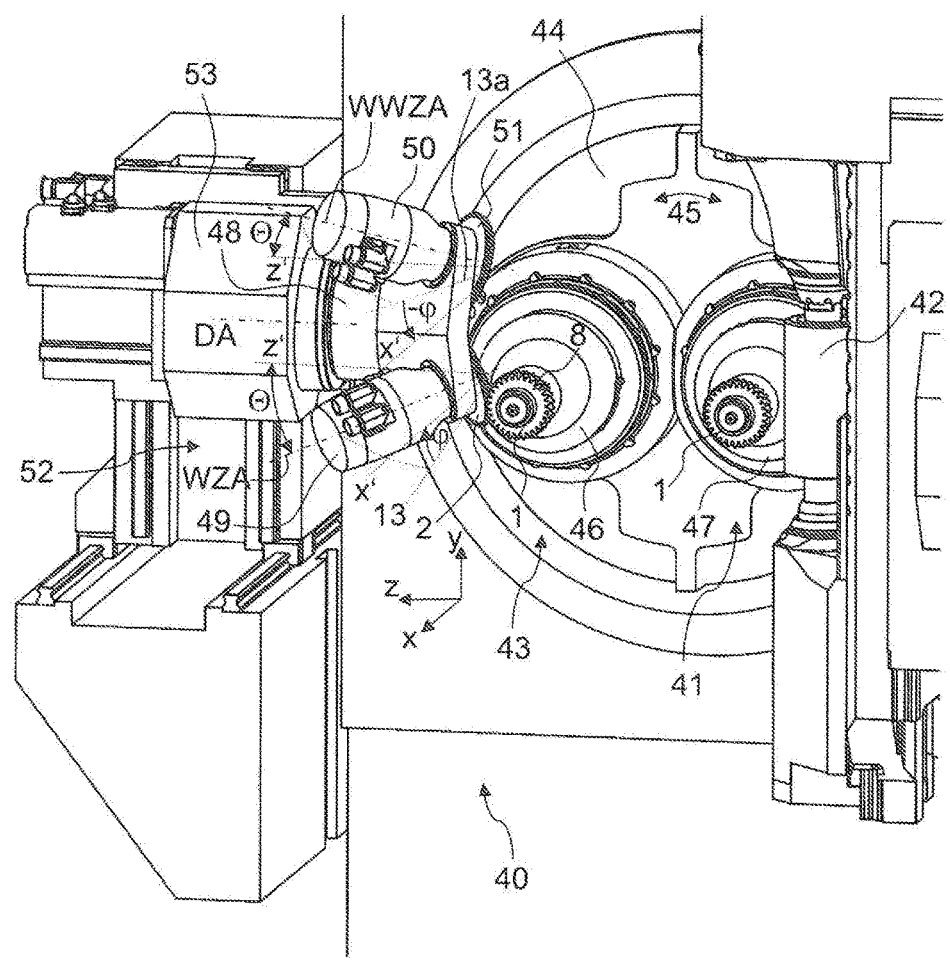
FIG. 4 shows a schematic oblique view of an embodiment of an apparatus according to the invention for skiving machining, for carrying out the method according to the invention.

FIG. 4 shows an apparatus 40 according to the invention (machine tool) for chamfering toothed workpieces 1, in particular in accordance with the method according to the invention.

The apparatus 40 has a station 41 for hobbing machining workpieces 1, having a gear hobber 42 which is equipped with conventional axes of rotation and movement. Furthermore, the apparatus 40 has a station 43 for chamfering workpieces 1, which is explained in more detail below; the station 43 is usually also used for changing workpieces, since chamfering a workpiece 1 usually requires less time than gear hobbing a workpiece 1.

In the embodiment shown, a turning holder 44 is provided, which is rotatable in the arrow direction 45 and can, as a result, position, in particular interchange, two workpiece spindles 46, 47 at the stations 41, 43. The turning holder 44 is in this case rotatable about a horizontal axis, and the workpiece spindle axes, about which the workpiece is 1 rotatable, are likewise arranged horizontally here. Typically, workpieces 1 are clamped on a workpiece spindle 46, 47 at the station 43, moved to the station 41 for gear hobbing by turning the turning holder 44, moved back to the station 41 for chamfering by turning the turning holder 44, and unclamped again; this sequence takes place in parallel on both workpiece spindles 46, 47 and in a manner offset through half a phase.

The station 43 for chamfering workpieces 1 is explained in more detail in the following text.

Arranged on a tool-spindle mount 48 are, in this case, a tool spindle 49 having a toothed tool 2 and also a further tool spindle 50 having a further toothed tool 51. The tool-spindle mount 48 can be moved linearly in the directions x, y, z, which are orthogonal to one another, by means of a motorized moving device (compound slide system) 52, and also be turned, by means of a motorized turning device 53, about an axis of rotation DA, which extends parallel to the z direction. The x direction is in this case oriented horizontally and parallel to the workpiece spindle axis of the workpiece spindle 46, the y direction extends vertically, and the z direction extends horizontally again.

In the moved position shown, a first chamfer is just being produced on the underside of the workpiece 1 on the workpiece spindle 46 with the tool 2 on the tool spindle 49; to this end, the tool 2 comes into contact with the workpiece 1 from the left-hand side, that is to say coming from the z direction. In order to produce the second chamfer on the underside, the tool-spindle mount 48 is repositioned with the motorized moving device (compound slide system) 52 such that the further tool 51 on the further tool spindle 50 comes into contact with the workpiece 1 from the left-hand side.

It should be noted that the tool axis WZA of the tool spindle 49 is tilted downward through an azimuth angle φ with respect to the x direction (cf. the associated parallel-shifted x' axis and the projection 13 of the tool axis WZA), and that the further tool axis WWZA of the further tool spindle 50 is tilted upward through a mirror inverted azimuth angle –φ with respect to the x direction (cf. the associated parallel-shifted x' axis and the projection 13a of the further tool axis WWZA). It should also be noted that the tool axis WZA of the tool spindle 49 is tilted through a polar angle Θ with respect to the z direction (cf. the associated parallel-shifted axis z'), and the further tool axis WWZA of the further tool spindle 50 is pivoted through the same polar angle Θ with respect to the z direction (cf. again the associated parallel-shifted axis z').

In order to produce the two chamfers on the top side 8 of the workpiece 1 in the workpiece spindle 46, the tool-spindle mount 48 is tilted through 180° about the rotation axis of rotation DA with the motorized turning device 53. Then, the first chamfer can be applied to the top side 8 of the workpiece 1 with the tool 2 and the second chamfer can be applied thereto with the further tool 51 (this not being illustrated in more detail).

It is noted that the total of four chamfers can in principle be applied to the workpiece 1 in any desired order. However, it is generally advantageous in terms of time to produce the two chamfers in each case on one side of the workpiece 1 (top side or underside) one directly after the other.

In summary, the invention describes a method for producing a chamfer (30) on a toothed workpiece (1), wherein a toothed tool (2) having tooth end edges (11, 31) that serve as rake faces and extend approximately perpendicularly to the tool axis (WZA) are rolled against the workpiece (1). In the process, an active cutting edge (32) formed on a lateral edge of the rake face (11, 31) slides over the edges of the tooth end faces (6) of the workpiece (1). The tool axis (WZA) is not only tilted through an azimuth angle φ with respect to the workpiece axis (WSA), as in conventional skiving, but additionally tilted through a polar angle Θ of less than 90° with respect to the perpendicular of the contact zone (KZ) of the workpiece (1) and tool (2) to the workpiece axis (WSA). The application of the chamfers can, in the scope of the invention, be used for toothed workpieces of all kinds, in particular gearwheels, axles having toothed regions or gears, in particular when no or only a small clearance is present axially beyond the toothing on the workpiece and/or large chamfer angles are desired.

What is claimed is:

1. An apparatus for skiving machining a toothed workpiece, comprising:
a workpiece spindle for rotating the toothed workpiece about a workpiece axis that extends in an x direction;
a tool spindle for rotating a toothed tool about a tool axis;
a tool-spindle mount on which the tool spindle is held and which is displaceable in each case linearly in the x direction, a y direction and a z direction by a motorized displacement device, wherein the x direction, the y direction and the z direction form a Cartesian coordinate system;
wherein the tool axis is tilted through an azimuth angle φ>0° with respect to the x direction;
wherein the tool axis is furthermore tilted through a polar angle Θ<90° with respect to the z direction;
wherein the tool spindle and a further tool spindle for rotating a further toothed tool about a further tool axis are held on the tool-spindle mount; and
wherein the further tool axis is tilted through a further azimuth angle –φ, mirror-inverted in relation to the azimuth angle φ of the tool axis, with respect to the x direction, and wherein the further tool axis is tilted through the same polar angle Θ with respect to the z direction as the tool axis.

2. The apparatus of claim 1, wherein the tool-spindle mount is rotatable about an axis of rotation by a motorized turning device.

3. The apparatus of claim 2, wherein the axis of rotation about which the tool-spindle mount is rotatable extends in the z direction.

4. The apparatus of claim 1, including a turning holder on which the workpiece spindle and at least one further workpiece spindle are arranged, and wherein at least one station having a gear hobbing head for hobbing machining the toothed workpiece on one of the workpiece spindles and furthermore a station having the tool-spindle mount for chamfering the toothed workpiece on another of the workpiece spindles by way of the skiving machining operation are set up on the apparatus.

5. The apparatus of claim 1, wherein the x direction and the z direction lie in a horizontal plane.

6. An apparatus for skiving machining a toothed workpiece, comprising:
 a workpiece spindle for rotating the toothed workpiece about a workpiece axis that extends in an x direction;
 a tool spindle for rotating a toothed tool about a tool axis;
 a tool-spindle mount on which the tool spindle is held and which is displaceable in each case linearly in the x direction, a y direction and a z direction by a motorized displacement device, wherein the x direction, the y direction and the z direction form a Cartesian coordinate system;
 wherein the tool axis is tilted through an azimuth angle φ>0° with respect to the x direction;
 wherein the tool axis is furthermore tilted through a polar angle Θ<90° with respect to the z direction; and
 a turning holder on which the workpiece spindle and at least one further workpiece spindle are arranged, and wherein at least one station having a gear hobbing head for hobbing machining the toothed workpiece on one of the workpiece spindles and furthermore a station having the tool-spindle mount for chamfering the toothed workpiece on another of the workpiece spindles by way of the skiving machining operation are set up on the apparatus.

7. The apparatus of claim 6, wherein the tool-spindle mount is rotatable about an axis of rotation by a motorized turning device.

8. The apparatus of claim 7, wherein the axis of rotation about which the tool-spindle mount is rotatable extends in the z direction.

9. The apparatus of claim 6, wherein the tool spindle and a further tool spindle for rotating a further toothed tool about a further tool axis are held on the tool-spindle mount.

10. The apparatus of claim 9, wherein the further tool axis is tilted through a further azimuth angle −φ, mirror-inverted in relation to the azimuth angle φ of the tool axis, with respect to the x direction, and wherein the further tool axis is tilted through the same polar angle Θ with respect to the z direction as the tool axis.

11. The apparatus of claim 6, wherein the x direction and the z direction lie in a horizontal plane.

* * * * *